United States Patent
Doepfert et al.

(10) Patent No.: US 12,326,185 B2
(45) Date of Patent: Jun. 10, 2025

(54) POWER TRAIN FOR A MOTOR VEHICLE

(71) Applicant: ZF Friedrichshafen AG, Friedrichshafen (DE)

(72) Inventors: Hagen Doepfert, Lindau (DE); Christoph Gradl, Markdorf (DE); Matthias Reisch, Ravensburg (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 0 days.

(21) Appl. No.: 18/505,487

(22) Filed: Nov. 9, 2023

(65) Prior Publication Data
US 2024/0159302 A1 May 16, 2024

(30) Foreign Application Priority Data
Nov. 10, 2022 (DE) ............ 10 2022 211 900.2

(51) Int. Cl.
*F16H 48/10* (2012.01)
*B60K 1/00* (2006.01)

(52) U.S. Cl.
CPC ............ *F16H 48/10* (2013.01); *B60K 1/00* (2013.01); *B60K 2001/001* (2013.01)

(58) Field of Classification Search
CPC ............ F16H 48/11; F16H 2048/106; F16H 2048/102; F16H 37/0813
See application file for complete search history.

(56) References Cited

U.S. PATENT DOCUMENTS

| | | | |
|---|---|---|---|
| 5,718,302 A | 2/1998 | Hasebe et al. | |
| 5,845,732 A * | 12/1998 | Taniguchi | B60K 17/16 180/65.6 |
| 9,657,826 B1 * | 5/2017 | Morgan | B60K 1/00 |
| 9,863,518 B2 * | 1/2018 | Kurth | F16H 48/10 |
| 11,815,169 B2 * | 11/2023 | Reisch | F16H 48/26 |
| 2017/0001513 A1 | 1/2017 | Kuroda et al. | |
| 2018/0238418 A1 * | 8/2018 | Takekawa | F16F 15/1201 |
| 2019/0248244 A1 * | 8/2019 | Gayney | F16H 9/26 |
| 2022/0205520 A1 | 6/2022 | Beck et al. | |

FOREIGN PATENT DOCUMENTS

| | | | | |
|---|---|---|---|---|
| CN | 103307124 A | * | 9/2013 | |
| CN | 111878554 A | * | 11/2020 | ......... F16H 37/0813 |
| DE | 102015200842 A1 | | 7/2016 | |
| DE | 102019205747 A1 | | 10/2020 | |
| DE | 102019219218 A1 | * | 6/2021 | ............... B60K 1/00 |
| FR | 3035934 A1 | * | 11/2016 | ............. F16D 1/101 |
| JP | 2008245433 A | * | 10/2008 | |
| WO | WO-2021078892 A1 | * | 4/2021 | ............... B60K 1/00 |

OTHER PUBLICATIONS

German Office Action DE 10 2022 211 900.2, dated Jul. 25, 2023. (10 pages).

* cited by examiner

*Primary Examiner* — Stacey A Fluhart
(74) *Attorney, Agent, or Firm* — Dority & Manning, P.A.

(57) ABSTRACT

A power train (1) for a motor vehicle (100) includes an electric machine (2) and a transmission (3) with at least one first planetary gear set (P1) that includes gear set elements with a sun gear (P1.1), a planet carrier (P1.2) and a ring gear (P1.3). The electric machine (2) includes a rotor (4), which transmits drive power via a rotor shaft (5) at least indirectly onto one of the gear set elements in the first planetary gear set (P1). The rotor shaft (5) is connected via a spline (6) to a first gear set element in the first planetary gear set (P1) for conjoint rotation.

14 Claims, 2 Drawing Sheets

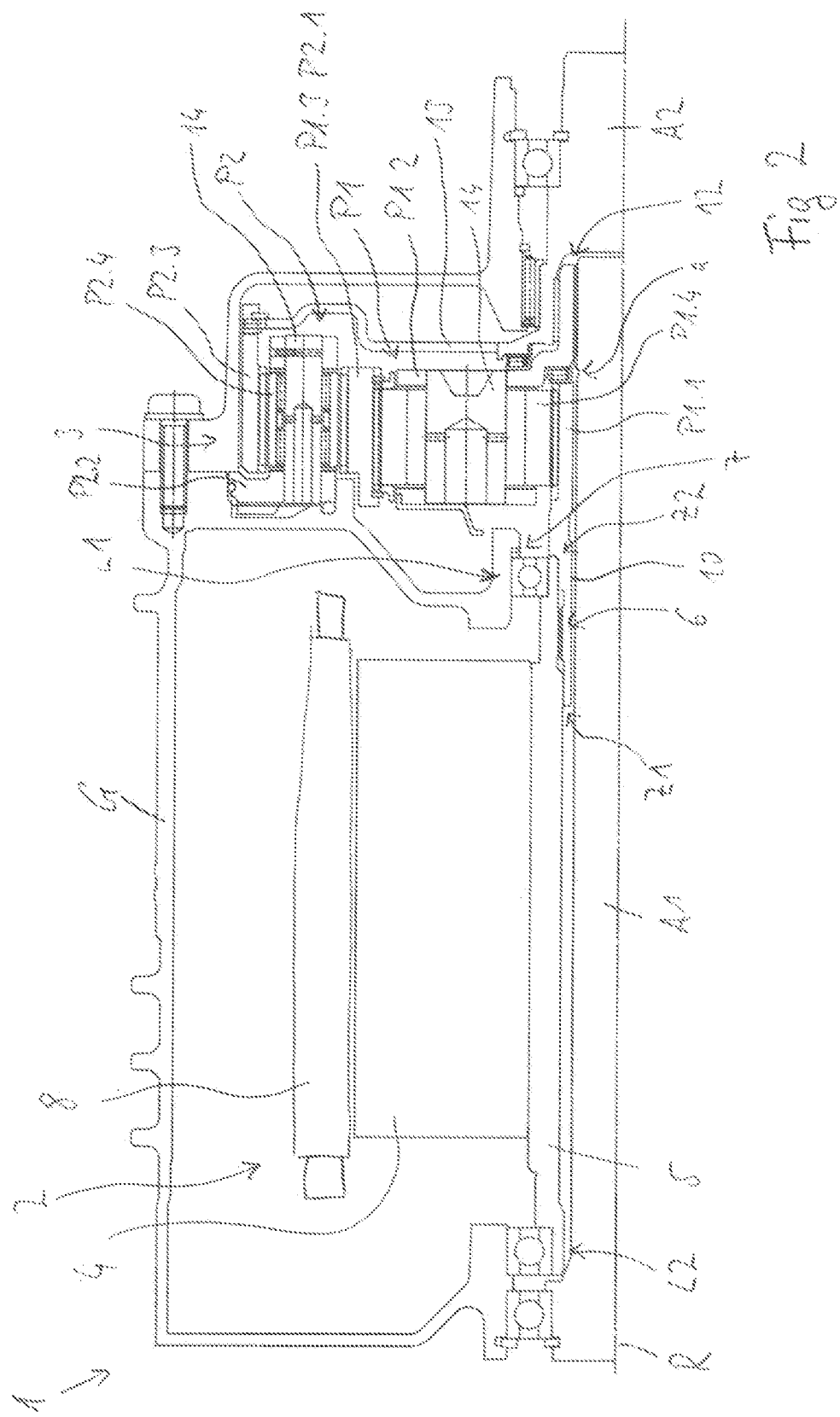

POWER TRAIN FOR A MOTOR VEHICLE

CROSS-REFERENCE TO RELATED APPLICATION

The present application is related and has right of priority to German Patent Application No. DE 102022211900.2 filed on Nov. 10, 2022, which is incorporated by reference in its entirety for all purposes.

FIELD OF THE INVENTION

The invention relates generally to a power train for a motor vehicle, the power train including an electric machine and a transmission having at least one first planetary gear set, which includes multiple gear set elements in the form of a sun gear, a planet carrier and a ring gear. The invention further relates generally to a motor vehicle that includes at least one power train of this type.

BACKGROUND

Power trains for motor vehicles are known from the prior art, which include electric machines, the rotor shaft of which is integrally connected to a sun gear shaft of a transmission which is drivingly connected to the electric machine. It is known that the rotor shaft is mounted via at least two bearing elements for rotation with respect to a transmission housing or a drive housing. When the sun gear shaft is provided with helical toothing, during the switch of the drive between traction and coasting, the entire rotor shaft is pushed back and forth within the axial play of the bearing elements. This results in mechanical strain on the entire rotor of the electric machine, which could negatively affect the function of a rotor position sensor which may be present. In the design and layout of the power train having a one-piece combination of the rotor shaft and the sun gear shaft, it is also to be observed that the outer diameter of the sun gear shaft toothing is smaller than the inner diameter of the transmission-side rotor shaft bearing, i.e., of the bearing element between the electric machine and the transmission.

It is also known to floatingly mount the rotor shaft, which is integrally connected to the sun gear shaft. If the floating mounting of the rotor shaft is axially preloaded with a spring, this can cause operating states to arise, in which the axial preload force is interrupted due to the axial force from a helical toothing of the sun gear, and the bearing elements run in a kinematically inconsistent manner.

SUMMARY OF THE INVENTION

Example aspects of the present invention provide a compact power train having an electric machine and a transmission, which is insensitive to concentricity faults between the electric machine and the transmission and which simplifies a design and assembly of the power train.

A power train according to example aspects of the invention for a motor vehicle has an electric machine and a transmission including at least one first planetary gear set, which has multiple gear set elements in the form of a sun gear, a planet carrier and a ring gear, wherein the electric machine has a rotor, which transmits drive power via a rotor shaft at least indirectly onto one of the gear set elements in the first planetary gear set, wherein the rotor shaft is connected via a spline to a first gear set element in the first planetary gear set for conjoint rotation. The first gear set element can be coupled directly to the rotor shaft via the spline. Alternatively, the first gear set element can be integrally connected to a shaft, on which an internal toothing or an external toothing for the spline is integrally formed. In this sense, either the rotor shaft is arranged partially or in sections spatially within the first gear set element or the shaft integrally connected thereto, or the first gear set element or the shaft integrally connected thereto is arranged partially or in sections spatially within the rotor shaft.

A spline is understood to be a form-locking shaft-hub connection, in which the rotor shaft has external toothing and the first gear set element in the first planetary gear set has internal toothing, or vice versa, the toothings engaging into one another in a substantially form-locking manner and thus forming a multiple-driver connection. The spline can preferably be a serration or a serrated gear, i.e., a serration spline, or involute gearing, i.e., an involute spline. In principle, a spline having straight and parallel tooth flanks is also conceivable. The teeth or the drivers and tooth gaps of the spline are preferably axially straight, i.e., not helical or the like, on the rotor shaft and also on the first gear set element in the first planetary gear set or on the shaft integrally connected thereto. The spline transmits torque between the first gear set element in the first planetary gear set and the rotor shaft. Therefore, there is a corotational connection between the first gear set element in the first planetary gear set and the rotor shaft, wherein the spline enables the first gear set element in the first planetary gear set to move axially in relation to the substantially axially fixed rotor shaft. The spline, in particular under load, also centers the first gear set element with respect to the rotor shaft.

The two-piece design of the rotor shaft and of the first gear set element in the first planetary gear set ensures, in particular during the switch of the drive between traction and coasting, that only the first gear set element in the first planetary gear set is axially movable within the axial play of the first gear set element, while the rotor shaft substantially retains axial position.

Due to the spline, the first gear set element in the first planetary gear set functions as a compensating element, which can compensate for possible concentricity faults between the rotor shaft and the transmission, in particular the at least first planetary gear set. Therefore, manufacturing inaccuracies can be compensated for. In addition, the manageability of the rotor shaft and of the first gear set element in the first planetary gear set is improved, since the parts that are separate prior to assembly are axially shorter, i.e., a one-piece arrangement of the rotor shaft and of the first gear set element in the first planetary gear set. This is advantageous, in particular, with respect to producing the toothings.

The electric machine includes, in addition to the rotatably arranged rotor which is drivingly connected to the rotor shaft, a stationary stator. The electric machine is preferably connected to an accumulator, which supplies the electric machine with electrical energy. Moreover, the electric machine is preferably controllable by way of an open-loop or closed-loop system by a power electronics system.

A "planetary gear set" is understood to be a unit that includes a sun gear, a ring gear and one or multiple planet gears guided by a planet carrier on a circular path around the sun gear, wherein the planet gears are meshed with the ring gear and/or the sun gear. At least a portion of the gear set elements, preferably all gear set elements, in the planetary gear set can be straight-cut or helical-cut.

Preferably, the rotor shaft is rotatably mounted in a stationary component via a first bearing element and at least a second bearing element, wherein the first bearing element is arranged axially between the electric machine and the transmission, and the second bearing element is arranged on a side of the electric machine situated opposite the first bearing element. In other words, the rotor of the electric machine is arranged axially between the two bearing elements. The particular bearing element is preferably a grooved ball bearing. A grooved ball bearing enables transmission of axial forces and radial forces. Other types of bearings that transmit at least radial forces, preferably both radial and axial forces, are also conceivable for the power train described in the present case. The two bearing elements are to be understood to be rotor shaft bearings.

The first bearing element is preferably axially preloaded by a spring element. The axial preload force preloads the rotor shaft in the direction of the second bearing element, such that the rotor shaft is held in axial position. Further preferably, the spring element is formed as a wave spring. The bearing kinematics and the bearing rigidity are positively affected by the spring element. The preload is preferably applied at the first bearing element, since the first gear set element in the first planetary gear set or the shaft rotationally fixed thereto is axially supported against the rotor shaft in a first direction. When there is an axial preload at the first bearing element, the axial position of the rotor shaft does not change when there is a switch between traction and coasting. As a result, a reliable and faultless function of a rotor position sensor in the electric machine can be ensured.

According to one exemplary embodiment, the first gear set element in the first planetary gear set is supported with respect to a second gear set element in the first planetary gear set via an axial bearing. The axial bearing is preferably an axial needle bearing. By the axial bearing, the two gear set elements in the first planetary gear set are axially supported against each other.

The transmission is preferably an integral differential. This is a combined transmission and differential, which converts as well as distributes torque onto the output shafts, wherein power distribution is also achieved. Therefore, the transmission is a differential gear. A transmission is therefore provided, which can perform the functions of torque conversion and torque distribution by one single integral assembly. In this type of transmission, the two wheel torques are not combined to form a single axle torque in a rotating component. Instead, the drive power introduced into the first gear set element in the first planetary gear set is divided in the integral differential and applied onto the output shafts operatively connected to the planetary gear sets in accordance with the design and the connection of the planetary gear sets. As a result, the components in the integral differential can be more slender due to the respective, relatively low torques the components have to accommodate. This also results in smaller components and a weight reduction.

An integral differential is understood to be a differential that has both a first planetary gear set and a second planetary gear set in the framework of example aspects of this invention, wherein the first planetary gear set is drivingly connected to the rotor shaft, to the second planetary gear set and to a first output shaft. The second planetary gear set is drivingly connected to a second output shaft. The input torque to the rotor shaft is convertible by an integral differential and is distributable and transmittable at a defined ratio onto the two output shafts. Preferably, fifty percent (50%), i.e., one half, of the input torque is transmitted onto each of the output shafts. Therefore, the differential does not have a component that is subjected to both output torques. In other words, the two torques are never combined. Furthermore, the integral differential has no gears that rotate in a block, or without a rolling motion, when the output rotational speeds of the output shafts are identical. Therefore, the intermeshed components in the integral differential always rotate in relation to one another, independently of the output rotational speeds of the output shafts. The output shafts of the integral differential are designed in particular to be at least indirectly connected to a wheel on the motor vehicle.

In this sense, the transmission, which is an integral differential, also includes a second planetary gear set, which has multiple gear set elements in the form of a sun gear, a planet carrier and a ring gear, wherein a second gear set element in the first planetary gear set is at least indirectly connected to the first output shaft for conjoint rotation and a third gear set element in the first planetary gear set is connected to a first gear set element in the second planetary gear set for conjoint rotation, wherein a second gear set element in the second planetary gear set is connected to a stationary component for conjoint rotation and a third gear set element in the second planetary gear set is at least indirectly connected to the second output shaft for conjoint rotation, and a first output torque is at least indirectly transmittable onto the first output shaft by means of the first planetary gear set, wherein a support torque of the first planetary gear set is convertible in the second planetary gear set such that a second output torque, which corresponds to the first output torque, is transmittable onto the second output shaft.

In principle, the planetary gear sets in the transmission, in particular in the integral differential, can be arbitrarily arranged with respect to one another and arbitrarily operatively connected to one another in order to implement a desired gear ratio. According to one exemplary embodiment, the first gear set element is a sun gear in the particular planetary gear set, the second gear set element is a planet carrier in the particular planetary gear set and the third gear set element is a ring gear in the particular planetary gear set. The rotor shaft is therefore connected via the spline to the sun gear in the first planetary gear set for conjoint rotation, wherein the planet carrier in the first planetary gear set is at least indirectly connected to the first output shaft for conjoint rotation and the ring gear in the first planetary gear set is at least indirectly connected to the sun gear in the second planetary gear set for conjoint rotation. In particular, the ring gear in the first planetary gear set is connected to the sun gear in the second planetary gear set for conjoint rotation via a coupling element, in particular a coupling shaft. In addition, the planet carrier in the second planetary gear set is arranged in a rotationally fixed manner, in particular at a housing of the transmission. In addition, the ring gear in the second planetary gear set is at least indirectly connected to the second output shaft for conjoint rotation. Further components, such as, for example, intermediate shafts and coupling shafts, can also be arranged between the gear set elements in the planetary gear sets. Therefore, all the comments presented in the previous parts of the description and in the following parts of the description regarding the first gear set element in the first planetary gear set apply in particular for the sun gear in the first planetary gear set and for the sun gear shaft, which is connected to the sun gear in the first planetary gear set for conjoint rotation.

Preferably, the first gear set element in the first planetary gear set is radially secured at the rotor shaft via at least a first centering, or vice versa. In other words, the centering effect of the spline is assisted by the at least first centering. In addition, the at least first centering implements the centering effect also in operating situations in which centering is not carried out by the spline. Such an operating situation exists, for example, when there is no load transmission between the rotor shaft and the first gear set element in the first planetary gear set. Either the first gear set element in the first planetary gear set is centered with respect to the rotor shaft or the rotor shaft is centered with respect to the first gear set element in the first planetary gear set.

The at least first centering is implemented by either guiding, in a manner without play, the rotor shaft into the first gear set element in the first planetary gear set or the shaft integrally connected thereto or, alternatively, by guiding, in a manner without play, the first gear set element in the first planetary gear set or the shaft integrally connected thereto in the rotor shaft. Therefore, there is a type of press fit, which has less radial play of the rotor shaft in relation to a first gear set element in the first planetary gear set or to the shaft integrally connected thereto, but enables axial movement of the first gear set element or the shaft integrally connected thereto. As a result, a quieter operation of the first gear set element in the first planetary gear set, in particular at high rotational speeds and/or low load, can be ensured. Not least because of the particular centering, the first gear set element in the first planetary gear set is aligned coaxially to the rotor shaft.

Preferably, the first gear set element in the first planetary gear set is radially secured at the rotor shaft via at least a second centering, or vice versa. The second centering is preferably carried out identically to the first centering, and so reference is made to the comments presented with respect to the first centering.

According to one exemplary embodiment, the spline is arranged axially between the two centerings. Due to the specific arrangement of the two centerings axially adjacently to the spline, the rotor shaft can be effectively prevented from tilting in relation to the first gear set element in the first planetary gear set, or vice versa. In addition, the absence of radial play between the first gear set element in the first planetary gear set and the rotor shaft is improved by a further centering. Alternatively, the centering can also take place directly in the toothing. For example, by centering the addendum circle of the shaft toothing in the root circle of the hub toothing, or vice versa.

Example aspects of the invention provide that at least the first gear set element in the first planetary gear set is helical-cut. Correspondingly, at least the second and the third gear set elements in the first planetary gear set are also helical-cut. According to one exemplary embodiment, the gear set elements in the second planetary gear set are also helical-cut. It is advantageous to select the helix direction of the toothing such that the first gear set element in the first planetary gear set, which is coupled to the rotor shaft via the spline, axially presses, in particular, the sun gear or the sun gear shaft integrally connected to the sun gear against the axial needle bearing, which has a greater load-bearing capacity, during traction operation of the drive. In the coasting condition, which generally has lower loads than the traction operation, the first gear set element in the first planetary gear set then presses against the second bearing element via the rotor shaft.

The particular planetary gear set is preferably a negative planetary gear set or a positive planetary gear set. A negative planetary gear set corresponds to a planetary gear set including a planet carrier, on which first planet gears are rotatably mounted, and including a sun gear and a ring gear, wherein the teeth on at least one of the planet gears meshes with the teeth on the sun gear as well as with the teeth on the ring gear, as a result of which the ring gear and the sun gear rotate in opposite directions when the sun gear rotates while the carrier is held. A positive planetary gear set differs from the negative planetary gear set in that the positive planetary gear set has first and second or inner and outer planet gears which are rotatably mounted on the planet carrier. The teeth of the first or inner planet gears mesh with the teeth of the sun gear and with the teeth of the second or outer planet gears. In addition, the teeth of the outer planet gears mesh with the teeth of the ring gear. As a result, the ring gear and the sun gear rotate in the same direction when the planet carrier is held.

In the design of one or both planetary gear set(s) as a positive planetary gear set, the connection of the planet carrier and the ring gear is interchanged and the absolute value of the stationary transmission ratio is increased by one (1). Correspondingly, this is also possible the other way around when a negative planetary gear set is to be provided in place of a positive planetary gear set. In this case, as compared to the positive planetary gear set, the ring gear connection and the planet carrier connection would also need to be interchanged, and a stationary transmission ratio would need to be reduced by one and the sign changed. Within the scope of example aspects of the invention, the two planetary gear sets are each preferably designed as a negative planetary gear set, however. Negative planetary gear sets have good efficiency and can be arranged axially next to one another or radially nested.

It is also conceivable to form one or both planetary gear set(s) as stepped planetary gear sets. Each stepped planetary gear of the particular stepped planetary gear set preferably has a first gearwheel with a second gearwheel, which is connected thereto for conjoint rotation. The first gearwheel is preferably meshed, for example, with the sun gear and the second gearwheel is therefore meshed with the ring gear, or vice versa. These two gearwheels can be connected to one another for conjoint rotation, for example, via an intermediate shaft or a hollow shaft. In the case of a hollow shaft, the hollow shaft can be rotatably mounted on a pin of the planet carrier. The two gearwheels in the particular stepped planetary gear preferably have different diameters and numbers of teeth in order to set a gear ratio. Composite planetary gear sets are also conceivable.

The term "operatively connected" is understood to be a permanent connection between two components, the permanent connection being provided for permanently transmitting drive power, in particular rotational speed and/or torque. The connection can be implemented directly or via a fixed ratio. The connection can be implemented, for example, via a fixed shaft, gear teeth, in particular on a spur gear, and/or with a belt.

The term "at least indirectly" is understood to mean that two components are (operatively) connected to one another via at least one other component, located between the two components, or that the two components are directly connected to one another. Other components can also be arranged between shafts or gear wheels, which are operatively connected to the shaft or to the gear wheel.

A "shaft" is understood to be a rotatable component in the transmission with which various components in the transmission are connected to one another for conjoint rotation or with which a connection of this type is established upon actuation of an appropriate shift element. The particular shaft can connect the components to one another axially or radially or also both axially and radially. A shaft is not to be understood exclusively to be a, for example, cylindrical, rotatably mounted machine element for transmitting torques, but rather a shaft is also understood to refer to general connecting elements that connect individual components or elements to one another, in particular, connecting elements that connect multiple elements to one another for conjoint rotation.

A motor vehicle according to example aspects of the invention has at least one power train as described above. The power train can therefore be used in a motor vehicle, in particular, an automobile (for example, a passenger car weighing less than 3.5 tons), a bus, or a truck (busses and trucks can weigh more than 3.5 tons). In particular, the motor vehicle is an electric vehicle or hybrid vehicle. The motor vehicle has at least two axles, in which one of the axles is formed by a drive axle that is drivable by the power train. The power train according to example aspects of the invention is operatively arranged on this drive axle and the power train transmits drive power to at least one of the wheels, preferably onto both wheels, on this axle. It is also conceivable to provide a power train according to example aspects of the invention for each axle of the motor vehicle, such that each axle is a driven axle.

The definitions presented above and comments presented regarding technical effects, advantages, and advantageous embodiments of the power train according to example aspects of the invention also apply similarly for the motor vehicle according to example aspects of the invention, and vice versa.

BRIEF DESCRIPTION OF THE DRAWINGS

An exemplary embodiment of the invention is explained in greater detail in the following with reference to the drawings, wherein identical or similar elements are labeled with the same reference character, wherein:

FIG. 2 shows a simplified schematic partial sectional view of the transmission according to example aspects of the invention shown in FIG. 1.

DETAILED DESCRIPTION

Figure 1:
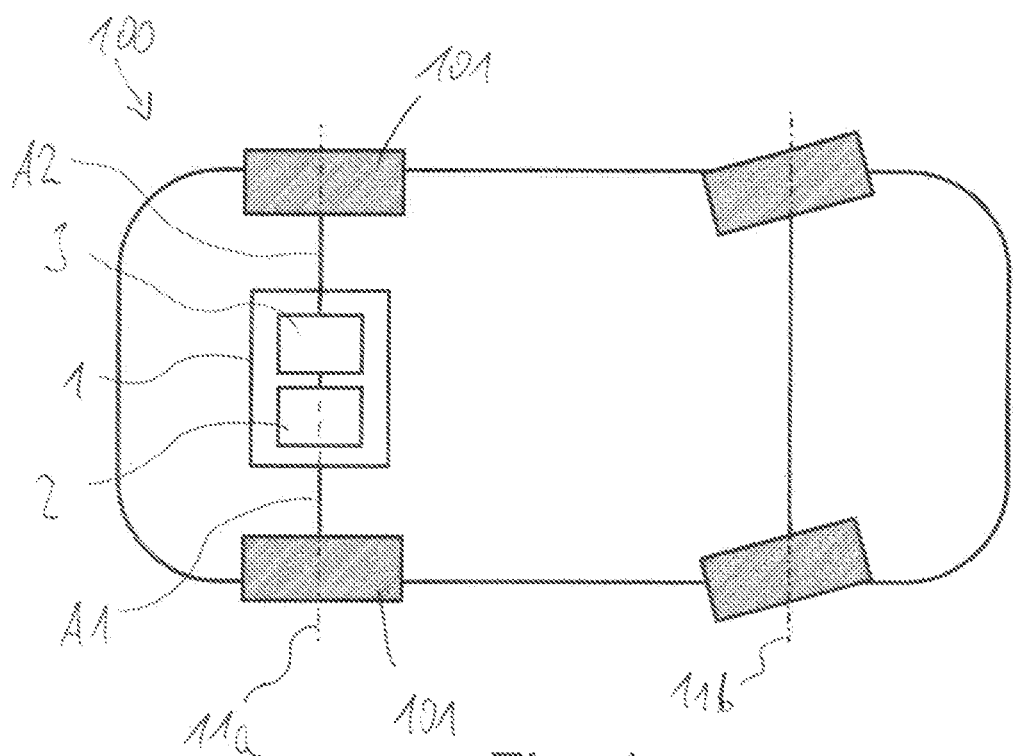
FIG. 1 shows a simplified schematic view of a motor vehicle according to example aspects of the invention with a power train according to example aspects of the invention.

Reference will now be made to embodiments of the invention, one or more examples of which are shown in the drawings. Each embodiment is provided by way of explanation of the invention, and not as a limitation of the invention. For example, features illustrated or described as part of one embodiment can be combined with another embodiment to yield still another embodiment. It is intended that the present invention include these and other modifications and variations to the embodiments described herein.

FIG. 1 shows a motor vehicle 100 with two axles 11a, 11b, a power train 2 according to example aspects of the invention being drivingly arranged at the first axle 11a. The first axle 11a can be both a front axle and a rear axle of the motor vehicle 100 and forms a driven axle of the motor vehicle 100. In this case, the first axle 11a is the rear axle of the motor vehicle 100.

The power train 1 includes an electric machine 2 and a transmission 3, which is operatively connected to the electric machine 2, wherein the design and the arrangement of the power train 1 is explained in greater detail in FIG. 2. The electric machine 2 includes a stationary, in particular chassis-fixed, stator 8, and a rotor 4, which, according to FIG. 2, is mounted for rotation with respect to the stator 8 via two bearing elements L1, L2 and has a rotor shaft 5. The bearing elements L1, L2 support the rotor shaft in a partially radial and partially axial manner at the stationary component G. The stationary component G is to be understood to be a housing of the power train 1.

The electric machine is supplied with electrical energy by an accumulator (not shown here), the accumulator therefore being operatively connected to the stator 8 shown in FIG. 2. Moreover, the electric machine 2 is connected to a power electronics system (not shown here) for open-loop control and closed-loop control. By energizing the stator 8, the rotor 4, together with the rotor shaft 5, is set into a rotational motion in relation to the stator 8. The drive power of the electric machine 2 is directed via the rotor shaft 5 into the transmission 3, which is in the form of an integral differential, and there is divided onto a first output shaft A1 and a second output shaft A2. The electric machine 2 is coaxial to the transmission 3. The output shafts A1, A2, which are coaxial to one another, are each indirectly connected to a wheel 101 (shown in FIG. 1) on the first axle 11a in order to drive the vehicle 1. Joints and wheel hubs (not shown here) can be arranged between the respective wheel 101 and the output shafts A1, A2 in order to compensate for possible inclinations of the output shafts A1, A2. Accordingly, the first axle 11a can be coaxial or axially parallel to a rotation axis R of the coaxial output shafts A1, A2. The motor vehicle 100 is an electric vehicle in the present case, wherein the vehicle is driven purely electrically.

According to FIG. 2, the transmission 3, which is in the form of an integral differential, includes a first planetary gear set P1, which has multiple gear set elements in the form of a sun gear P1.1, a planet carrier P1.2 and a ring gear P1.3, and a second planetary gear set P2, which also has multiple gear set elements in the form of a sun gear P2.1, a planet carrier P2.2 and a ring gear P2.3. The two planetary gear sets P1, P2 are in the form of negative planetary gear sets in the present case. Accordingly, the first planetary gear set P1 has a set of planet gears P1.4, which mesh with the sun gear P1.1 and the ring gear P1.3 in the first planetary gear set P1 and are rotatably mounted on the planet carrier P1.2. In addition, the second planetary gear set P2 has a set of planet gears P2.4, which mesh with the sun gear P2.1 and the ring gear P2.3 in the second planetary gear set P2 and are rotatably mounted on the planet carrier P2.2. The planet gears P1.4, P2.4 are mounted via respective planet shafts 14 on the associated planet carrier P1.2, P2.2.

In the present case, the first gear set element in the respective planetary gear set P1, P2 is the sun gear P1.1, P2.1, the second gear set element in the respective planetary gear set P1, P2 is the planet carrier P1.2, P2.2 and the third gear set element in the respective planetary gear set P1, P2 is the ring gear P1.3, P2.3. In the present case, all gear set elements in the planetary gear sets P1, P2 are helical-cut.

The sun gear P1.1 in the first planetary gear set P1 is connected to a sun gear shaft 10 for conjoint rotation. The sun gear shaft 10 is coupled to the rotor shaft 5 via a spline 6. The spline 6 is arranged axially between a first centering Z1 and a second centering Z2, wherein the centerings Z1, Z2 minimize radial play between the rotor shaft 5 and the sun gear shaft 10. The centerings Z1, Z2 ensure smoother operation of the sun gear shaft 10 at high rotational speeds and low load. Torque is transmitted between the rotor shaft 5 and the sun gear shaft 10 by the spline 6. Under load, the spline 6 also functions to center the rotor shaft 5 in relation to the sun gear shaft 10. In the present case, the sun gear shaft 10 has been pressed into the rotor shaft 5.

The sun gear shaft 10 and the sun gear P1.1 in the first planetary gear set P1 are supported axially against the planet carrier P1.2 in the first planetary gear set P1 via an axial bearing 9, which is in the form of an axial needle bearing. The planet carrier P1.2 in the first planetary gear set P1 is connected to the first output shaft A1 for conjoint rotation via a second spline 12. The first output shaft A1 passes axially through the electric machine 2, as a result of which further installation space is reduced. The ring gear P1.3 in the first planetary gear set P1 is formed in one piece with the sun gear P2.1 in the second planetary gear set P2. The planet carrier P2.2 in the second planetary gear set P2 is rotationally fixed on the stationary component G, wherein the ring gear P2.3 in the second planetary gear set P2 is connected via a coupling element 13 to the second output shaft A2 for conjoint rotation. A first output torque is transmittable onto the first output shaft A1 by the first planetary gear set P1. A support torque of the first planetary gear set P1 is convertible in the second planetary gear set P2 such that a second output torque, which corresponds to the first output torque, is transmittable onto the second output shaft A2.

The first bearing element L1 for mounting the rotor shaft 5 is arranged axially between the electric machine 2 and the transmission 3, wherein the second bearing element L2 for mounting the rotor shaft 5 is arranged on an opposite side of the electric machine 2 with respect to the first bearing element L1. Therefore, in the view according to FIG. 2, the first bearing element L1 is arranged on the right and the second bearing element L2 is arranged on the left of the electric machine 2. The first bearing element L1 is axially preloaded in the direction of the electric machine 2 by a spring element 7, which is in the form of a wave spring, in order to hold the rotor shaft 5 in axial position. The second bearing element L2 is simultaneously axially supported against the stationary component G. The preload is therefore preferably applied at the right bearing element L1, since the sun gear shaft 10 is axially supported against the rotor shaft 5 in a first direction. When there is an axial preload at the first bearing element L1, the axial position of the rotor shaft 5 does not change when there is a switch between traction and coasting.

Due to the helical teeth on the gear set elements, in the traction operation, the sun gear shaft 10 presses axially against the axial bearing 9, which has a greater load-bearing capacity. In the coasting operation, however, the sun gear shaft 10 presses via the rotor shaft 5 against the second bearing element L2, which is axially supported against the stationary component G.

The invention is not limited to the disclosed example embodiments. Other embodiments or variations result for a person skilled in the art within the scope of the utilization of the present invention and within the scope of a precise analysis of the drawings, the description, and the patent claims. In particular, a person skilled in the art recognizes that the rotor shaft 5 can also be arranged partially or in sections, i.e., in the area of the spline 6, spatially within the sun gear shaft 10. It is also conceivable that the second axle 11b of the motor vehicle 100 also has a power train 2 according to example aspects of the invention.

Modifications and variations can be made to the embodiments illustrated or described herein without departing from the scope and spirit of the invention as set forth in the appended claims. In the claims, reference characters corresponding to elements recited in the detailed description and the drawings may be recited. Such reference characters are enclosed within parentheses and are provided as an aid for reference to example embodiments described in the detailed description and the drawings. Such reference characters are provided for convenience only and have no effect on the scope of the claims. In particular, such reference characters are not intended to limit the claims to the particular example embodiments described in the detailed description and the drawings.

REFERENCE CHARACTERS 1 power train
2 electric machine
3 transmission
4 rotor
5 rotor shaft
6 spline
7 spring element
8 stator
9 axial bearing
10 sun gear shaft
11a first axle
11b second axle
12 second spline
13 coupling element
14 planet shaft
100 motor vehicle
101 wheel
A1 first output shaft
A2 second output shaft
G stationary component
L1 first bearing element
L2 second bearing element
P1 first planetary gear set
P1.1 sun gear in the first planetary gear set
P1.2 planet carrier in the first planetary gear set
P1.3 ring gear in the first planetary gear set
P1.4 planet gear in the first planetary gear set
P2 second planetary gear set
P2.1 sun gear in the second planetary gear set
P2.2 planet carrier in the second planetary gear set
P2.3 ring gear in the second planetary gear set
P2.4 planet gear in the second planetary gear set
R rotation axis
Z1 first centering
Z2 second centering

The invention claimed is:

1. A power train (1) for a motor vehicle (100), comprising:
an electric machine (2); and
a transmission (3) comprising at least one first planetary gear set (P1) with a plurality of gear set elements that include a sun gear (P1.1), a planet carrier (P1.2) guiding one or multiple planet gears, and a ring gear (P1.3),
wherein the electric machine (2) comprises a rotor (4) for transmitting drive power via a rotor shaft (5) at least indirectly onto a first gear set element of the first planetary gear set (P1) meshing with the one or multiple planet gears, and
wherein the rotor shaft (5) is connected via a spline (6) to the first gear set element of the first planetary gear set (P1) for conjoint rotation such that the first gear set element in the first planetary gear set (P1) is axially movable within an axial play of the first gear set element while the rotor shaft (5) substantially retains an axial position of the rotor shaft (5), the spline being different from the meshing between the first gear set element and the one or multiple planet gears.

2. The power train (1) of claim 1, wherein:
the rotor shaft (5) is rotatably mounted in a stationary component (G) via a first bearing element (L1) and at least one second bearing element (L2);

the first bearing element (L1) is arranged axially between the electric machine (2) and the transmission (3); and the second bearing element (L2) is arranged opposite the first bearing element (L1) about the electric machine (2).

3. The power train (1) of claim 2, wherein the first bearing element (L1) is axially preloaded by a spring (7).

4. The power train (1) of claim 3, wherein the spring (7) is a wave spring.

5. The power train (1) of claim 1, wherein the first gear set element of the first planetary gear set (P1) is supported with respect to a second gear set element of the first planetary gear set (P1) by an axial bearing (9).

6. The power train (1) of claim 1, wherein the transmission (3) is an integral differential.

7. The power train (1) of claim 6, wherein:

the transmission (3) comprises a second planetary gear set (P2) with a plurality of gear set elements that include a sun gear (P2.1), a planet carrier (P2.2), and a ring gear (P2.3);

a second gear set element of the first planetary gear set (P1) is at least indirectly connected to the first output shaft (A1) for conjoint rotation, and a third gear set element of the first planetary gear set (P1) is connected to a first gear set element of the second planetary gear set (P2) for conjoint rotation;

a second gear set element of the second planetary gear set (P2) is connected to a stationary component (G) for conjoint rotation; and a third gear set element of the second planetary gear set (P2) is at least indirectly connected to the second output shaft (A) for conjoint rotation; and a first output torque is transmittable onto the first output shaft (A1) by the first planetary gear set (P1), and a support torque of the first planetary gear set (P1) is convertible in the second planetary gear set (P2) such that a second output torque, which corresponds to the first output torque, is transmittable onto the second output shaft (A2).

8. The power train (1) of claim 1, wherein:

the first gear set element of the first planetary gear set (P1) is the sun gear (P1.1) of the first planetary gear set (P1), the second gear set element of the first planetary gear set (P1) is the planet carrier (P1.2) of the first planetary gear set (P1), and the third gear set element of the first planetary gear set (P1) is the ring gear (P1.3) of the first planetary gear set (P1); and the first gear set element of the second planetary gear set (P2) is the sun gear (P2.1) of the second planetary gear set (P2), the second gear set element of the second planetary gear set (P2) is the planet carrier (P2.2) of the second planetary gear set (P2), and the third gear set element of the second planetary gear set (P2) is the ring gear (P2.3) of the second planetary gear set (P2).

9. The power train (1) of claim 1, wherein the first gear set element of the first planetary gear set (P1) is radially secured at the rotor shaft (5) via a first centering (Z1), or the rotor shaft (5) is radially secured at the first gear set element of the first planetary gear set (P1) via the first centering (Z1).

10. The power train (1) of claim 9, wherein the first gear set element of the first planetary gear set (P1) is radially secured at the rotor shaft (5) via a second centering (Z2), or the rotor shaft (5) is radially secured at the first gear set element of the first planetary gear set (P1) via the second centering (Z2).

11. The power train (1) of claim 10, wherein the spline (6) is arranged axially between the first and second centerings (Z1, Z2).

12. The power train (1) of claim 1, wherein at least the first gear set element of the first planetary gear set (P1) is helical-cut.

13. The power train (1) of claim 1, wherein the first planetary gear set (P1, P2) is a negative planetary gear set or a positive planetary gear set.

14. A motor vehicle (100), comprising at least one of the power train (1) of claim 1.

* * * * *